US008501307B2

(12) United States Patent
Zhamu et al.

(10) Patent No.: US 8,501,307 B2
(45) Date of Patent: Aug. 6, 2013

(54) RECOMPRESSED EXFOLIATED GRAPHITE ARTICLES

(75) Inventors: Aruna Zhamu, Centerville, OH (US); Jinjun Shi, Columbus, OH (US); Jiusheng Guo, Centerville, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 0 days.

(21) Appl. No.: 11/899,009

(22) Filed: Sep. 4, 2007

(65) Prior Publication Data

US 2009/0061191 A1 Mar. 5, 2009

(51) Int. Cl.

| | |
|---|---|
| ***B32B 9/00*** | (2006.01) |
| ***H01B 1/04*** | (2006.01) |
| ***H01B 1/06*** | (2006.01) |

(52) U.S. Cl.
USPC ............................ 428/220; 252/500; 252/502

(58) Field of Classification Search
USPC .................................. 428/220; 252/500, 502
See application file for complete search history.

(56) References Cited

U.S. PATENT DOCUMENTS 3,492,197 A 1/1970 Olstowski et al.
4,265,952 A 5/1981 Caines
4,530,949 A 7/1985 Atkinson et al.
4,704,231 A 11/1987 Chung
4,729,910 A 3/1988 Fukuda et al.
4,915,925 A * 4/1990 Chung ....................... 423/447.1
4,946,892 A 8/1990 Chung
5,300,370 A 4/1994 Washington et al.
5,527,363 A 6/1996 Wilkinson et al.
5,885,728 A 3/1999 Mercuri et al.
6,037,073 A 3/2000 Besmann et al.
6,037,074 A 3/2000 Mercuri et al.
6,171,720 B1 1/2001 Besmann et al.
6,248,467 B1 6/2001 Wilson et al.
6,432,336 B1 * 8/2002 Mercuri et al. ................. 264/51
6,451,486 B1 * 9/2002 Davis et al. ................... 429/232
6,706,400 B2 3/2004 Mercuri et al.
6,746,771 B2 6/2004 Öttinger et al.
6,881,512 B2 4/2005 Saito et al.

(Continued)

OTHER PUBLICATIONS

U.S. Appl. No. 11/293,540, filed Dec. 5, 2005, Jang.

(Continued)

*Primary Examiner* — David Sample
*Assistant Examiner* — Tahseen N Khan
(74) *Attorney, Agent, or Firm* — Mark Levy; Thompson Hine LLP

(57) ABSTRACT

This invention provides an electrically conductive, less anisotropic, recompressed exfoliated graphite article comprising a mixture of (a) expanded or exfoliated graphite flakes; and (b) particles of non-expandable graphite or carbon, wherein the non-expandable graphite or carbon particles are in the amount of between about 3% and about 70% by weight based on the total weight of the particles and the expanded graphite flakes combined; wherein the mixture is compressed to form the article having an apparent bulk density of from about 0.1 g/cm$^3$ to about 2.0 g/cm$^3$. The article exhibits a thickness-direction conductivity typically greater than 50 S/cm, more typically greater than 100 S/cm, and most typically greater than 200 S/cm. The article, when used in a thin foil or sheet form, can be a useful component in a sheet molding compound plate used as a fuel cell separator or flow field plate. The article may also be used as a current collector for a battery, supercapacitor, or any other electrochemical cell.

24 Claims, 7 Drawing Sheets

U.S. PATENT DOCUMENTS

| | | | | |
|---|---|---|---|---|
| 6,939,638 | B2 | 9/2005 | Saito et al. | |
| 7,147,960 | B2 * | 12/2006 | Baurens et al. | 429/514 |
| 2001/0046560 | A1 | 11/2001 | Fong et al. | |
| 2002/0068210 | A1 * | 6/2002 | Saito et al. | 429/34 |
| 2002/0164483 | A1 * | 11/2002 | Mercuri et al. | 428/408 |
| 2003/0116753 | A1 * | 6/2003 | Norley et al. | 252/500 |
| 2004/0028993 | A1 * | 2/2004 | Jousse et al. | 429/44 |
| 2004/0229993 | A1 | 11/2004 | Huang et al. | |
| 2004/0234860 | A1 * | 11/2004 | Qu et al. | 429/232 |
| 2005/0116376 | A1 * | 6/2005 | Egami et al. | 264/105 |
| 2007/0015267 | A1 | 1/2007 | Da Silva et al. | |
| 2007/0125493 | A1 * | 6/2007 | Jang et al. | 156/324 |
| 2007/0158618 | A1 * | 7/2007 | Song et al. | 252/500 |
| 2008/0248275 | A1 * | 10/2008 | Jang et al. | 428/220 |

OTHER PUBLICATIONS

U.S. Appl. No. 11/293,541, filed Dec. 5, 2005, Jang, et al.
U.S. Appl. No. 11/800,729, filed May 8, 2007, Zhamu, et al.
U.S. Appl. No. 11/800,730, filed May 8, 2007, Zhamu, et al.
U.S. Appl. No. 11/807,379, filed May 29, 2007, Zhamu, et al.
GrafTech trade brochure, “GrafCell: Fuel Cell Components—FFP Series,” www.grafcell.com, 2006.

* cited by examiner

RECOMPRESSED EXFOLIATED GRAPHITE ARTICLES

This invention is based on the research results of a project supported by the US Department of Energy (DOE) SBIR-STTR Program. The US government has certain rights on this invention.

The present application is related to the following co-pending applications: (a) Aruna Zhamu, Jinjun Shi, Jiusheng Guo and Bor Z. Jang, "Exfoliated Graphite Composite Compositions for Fuel Cell Flow Field Plates," U.S. patent Ser. No. 11/800,729 (May 8, 2007); (b) Aruna Zhamu, Jinjun Shi, Jiusheng Guo and Bor Z. Jang, "Method of Producing Exfoliated Graphite Composite Compositions for Fuel Cell Flow Field Plates," U.S. patent Ser. No. 11/800,730 (May 8, 2007); and (c) Aruna Zhamu, Jinjun Shi, Jiusheng Guo and Bor Z. Jang, "Laminated Exfoliated Graphite Composite-Metal Compositions for Fuel Cell Flow Field Plate or Bipolar Plate Applications," U.S. patent Ser. No. 11/807,379 (May 29, 2007).

FIELD OF THE INVENTION

The present invention provides a recompressed exfoliated graphite composition composed of expanded graphite and a non-expandable graphite or carbon component. The composition can be used to make separators, current collectors, and bipolar plates or flow field plates for fuel cells or current collectors for batteries, supercapacitors, and other electrochemical cells. In particular, the present invention provides a highly conducting, less anisotropic exfoliated graphite sheet for fuel cell separator or flow field plate applications, which has an exceptionally high electrical conductivity in the plate thickness direction.

BACKGROUND OF THE INVENTION

A fuel cell converts chemical energy into electrical energy and some thermal energy by means of a chemical reaction between a fuel (e.g., hydrogen gas or a hydrogen-containing fluid) and an oxidant (e.g., oxygen). A proton exchange membrane (PEM) fuel cell uses hydrogen or hydrogen-rich reformed gases as the fuel, a direct-methanol fuel cell (DMFC) uses methanol-water solution as the fuel, and a direct ethanol fuel cell (DEFC) uses ethanol-water solution as the fuel, etc. These types of fuel cells that require utilization of a PEM layer as a proton transport electrolyte are collectively referred to as PEM-type fuel cells.

A PEM-type fuel cell is typically composed of a seven-layered structure, including (a) a central PEM electrolyte layer for proton transport; (b) two electro-catalyst layers on the two opposite primary surfaces of the electrolyte membrane; (c) two fuel or gas diffusion electrodes (GDEs, hereinafter also referred to as diffusers) or backing layers stacked on the corresponding electro-catalyst layers (each GDE comprising porous carbon paper or cloth through which reactants and reaction products diffuse in and out of the cell); and (d) two flow field plates (or a bi-polar plate) stacked on the GDEs. The flow field plates are typically made of graphite, metal, or conducting composite materials, which also serve as current collectors. Gas-guiding channels are defined on a GDE facing a flow field plate or, more typically, on a flow field plate surface facing a GDE. Reactants (e.g., $H_2$ or methanol solution) and reaction products (e.g., $CO_2$ at the anode of a DMFC, and water at the cathode side) are guided to flow into or out of the cell through the flow field plates. The configuration mentioned above forms a basic fuel cell unit. Conventionally, a fuel cell stack comprises a number of basic fuel cell units that are electrically connected in series to provide a desired output voltage. If desired, cooling channels and humidifying plates may be added to assist in the operation of a fuel cell stack.

In one common practice, a fuel flow field plate and an oxidant gas flow field plate are separately made and then assembled together to form a bipolar plate (one side of a bipolar plate serving as a negative terminal and the other side as a positive terminal, hence the name). In some cases, an additional separator is sandwiched between the two flow field plates to form a bipolar plate. It would be highly advantageous if the flow filed plates and the separator can be mass-produced into an integrated bipolar plate assembly. This could significantly reduce the overall fuel cell production costs and reduce contact ohmic losses across constituent plate interfaces. The bipolar plate is known to significantly impact the performance, durability, and cost of a fuel cell system. The bipolar plate, which is typically machined from graphite, is one of the most costly components in a PEM fuel cell.

Fluid flow field plates have open-faced channels formed in one or both opposing major surfaces for distributing reactants to the gas diffuser plates, which are the anode and cathode backing layers, typically made of carbon paper or fabric. The open-faced channels also provide passages for the removal of reaction products and depleted reactant streams. Optionally, a bipolar plate may have coolant channels to manage the fuel cell temperature. According to the US Department of Energy (DOE), a bipolar plate should have the following desirable characteristics: high electrical conductivity (e.g., preferably having a thickness-direction conductivity no less than 100 S/cm and specific areal conductivity no less than 200 S/cm$^2$), low permeability to fuel or oxidant fluids, good corrosion resistance, and good structural integrity. The specific areal conductivity is essentially the bipolar plate thickness-direction conductivity divided by the plate thickness. Hence, it is highly desirable to have a thinner plate. Current graphite bipolar plates, typically 3-5 mm thick, should preferably be reduced to below 1 mm and most preferably below 0.5 mm.

Conventional methods of fabricating fluid flow field plates require the engraving or milling of flow channels into the surface of rigid plates formed of a metal, graphite, or carbon-resin composite. Such plates are expensive due to high machining costs. The machining of channels into the graphite plate surfaces causes significant tool wear and requires significant processing times. Metals can be readily shaped into very thin plates, but long-term corrosion is a major concern. A corrosion-resistant coating may be used, but it has to be applied perfectly. The coating may also increase contact resistance.

Alternatively, fluid flow field plates can be made by a lamination process (e.g., U.S. Pat. No. 5,300,370, issued Apr. 5, 1994), wherein an electrically conductive, fluid impermeable separator layer and an electrically conductive stencil layer are consolidated to form one open-faced channel. Presumably, two conductive stencil layers and one separator layer may be laminated to form a bipolar plate. It is often difficult and time-consuming to properly position and align the separator and stencil layers. Die-cutting of stencil layers require a minimum layer thickness, which limits the extent to which fuel cell stack thickness can be reduced. Such laminated fluid flow field assemblies tend to have higher manufacturing costs than integrated plates, due to the number of manufacturing steps associated with forming and consolidating the separate layers. They are also prone to delamination due to poor interfacial adhesion and vastly different coefficients of thermal expansion between a stencil layer (typically a metal) and a separator layer. Corrosion also presents a challenging issue for metal-based bipolar plates in a PEM fuel cell since they are used in an acidic environment.

A variety of composite bipolar plates have been developed, which are mostly made by compression molding of polymer matrices (thermoplastic or thermoset resins) filled with conductive particles such as graphite powders or fibers. Because most polymers have extremely low electronic conductivity, excessive conductive fillers have to be incorporated, resulting in an extremely high viscosity of the filled polymer melt or liquid resin and, hence, making it very difficult to process. Bi-polar plates for use in PEM fuel cells constructed of graphite powder/fiber filled resin composite materials and having gas flow channels are reviewed by Wilson, et al (U.S. Pat. No. 6,248,467, Jun. 19, 2001). Injection-molded composite-based bipolar plates are disclosed by Saito, et al. (U.S. Pat. No. 6,881,512, Apr. 19, 2005 and U.S. Pat. No. 6,939,638, Sep. 6, 2005). These thermoplastic or thermoset composites exhibit a bulk conductivity significantly lower than 100 S/cm (the US Department of Energy target value), typically not much higher than 10 S/cm.

Besmann, et al. disclosed a carbon/carbon composite-based bipolar plate (U.S. Pat. No. 6,171,720 (Jan. 9, 2001) and U.S. Pat. No. 6,037,073 (Mar. 14, 2000)). The manufacture process consists of multiple steps, including production of a carbon fiber/phenolic resin preform via slurry molding, followed by a compression-molding step. The molded part is then pyrolyzed at a high temperature (1,500° C.-2,500° C.) to obtain a highly porous carbon/carbon composite. This is followed by chemical vapor infiltration (CVI) of a carbon matrix into this porous structure. It is well-known that CVI is a very time-consuming and energy-intensive process and the resulting carbon/carbon composite, although exhibiting a high electrical conductivity, is very expensive.

Instead of using pyrolyzation and CVI to produce carbon/carbon composites, Huang, et al. (US Patent Application Pub. No. 2004/0229993, Nov. 18, 2004) discloses a process to produce a thermoplastic composite with a high graphite loading. First, polymer fibers, such as thermotropic liquid crystalline polymers or polyester, reinforcing fibers such as glass fibers, and graphite particles are combined with water to form a slurry. The slurry is pumped and deposited onto a sieve screen. The sieve screen serves the function of separating the water from the mixture of polymer fibers, glass fibers and graphite. The mixture forms a wet-lay sheet which is placed in an oven. Upon heating to a temperature sufficient to melt the polymer fibers, the wet-lay sheet is allowed to cool and have the polymer material solidify. Upon solidification, the wet-lay sheet takes the form of a sheet material with reinforcement glass fibers held together by globules of thermoplastic material, and graphite particles adhered to the sheet material by the thermoplastic material. Several of these sheets are then stacked, preferably with additional graphite powder interspersed between sheets, and compression-molded in a hot press. After application of heat and pressure in the press, one or more formed bipolar plates are obtained, where the bipolar plates are a composite of glass fibers, thermoplastic matrix and graphite particles. Clearly, this is also a tedious process which is not amenable to mass production.

Alternatively, fluid flow field plates can be made from an electrically conductive, substantially fluid impermeable material that is sufficiently compressible or moldable so as to permit embossing. Flexible graphite sheet is generally suitable for this purpose because it is relatively impervious to typical fuel cell reactants and coolants and thus is capable of isolating the fuel, oxidant, and coolant fluid streams from each other. It is also compressible and embossing processes may be used to form channels in one or both major surfaces. The "flexible graphite" is typically obtained in the following manner: Natural graphite particles are treated with an agent that intercalates into the graphite crystal structure (inter-graphene layer spaces) to form a graphite intercalation compound (GIC) or "expandable graphite." Rapid heating of a GIC or expandable graphite to a high temperature, typically 700-1,050° C., results in a large expansion of the graphite crystal structure by typically 80-300 times in the c-axis direction, the direction that is perpendicular to the graphene plane or basal plane of the graphite crystal structure. The exfoliated graphite particles are vermiform in appearance, and are therefore commonly referred to as graphite worms. Hereinafter, the term "exfoliated graphite" will be used interchangeably with the term "expanded graphite" or graphite worms. The worms are typically characterized as having exfoliated flakes that are substantially interconnected. An "exfoliated flake" is typically composed of one or multiple graphene planes (sheets) bonded together by van der Waals forces with an inter-planar spacing of typically from 0.335 (graphite) to 0.6 nm (graphite oxide) between two un-expanded basal planes inside a flake. However, there are pores between exfoliated flakes that are typically between 10 nm and 10 μm wide. These pores make the worms fluffy and compressible. The worms may be re-compressed together into flexible sheets which, unlike the original graphite flakes, can be easily formed and cut into various shapes. These thin sheets (foils or films) are hereinafter referred to as flexible graphite. Flexible graphite can be wound up on a drum to form a roll of thin film, just like a roll of thin plastic film or paper.

Although flexible graphite sheets are highly conductive (in a direction parallel to the sheet plane), they by themselves may not have sufficient stiffness and must be supported by a core layer or impregnated with a resin. For example, Wilkinson, et al., in U.S. Pat. No. 5,527,363 (Jun. 18, 1996), disclosed a fluid flow field plate comprising a metal sheet interposed between two flexible graphite (FG) sheets having flow channels embossed on a major surface thereof. Prior art flexible graphite sheets typically have a thickness-direction conductivity up to only 15 S/cm, although its in-plane conductivity may be greater than 1,300 S/cm. These FG-metal-FG laminates are expected to exhibit a thickness-direction conductivity less than 100 S/cm, the US DOE requirement. This may be illustrated as follows: Assume that the top layer, bottom layer, and core layer of the three-layer laminate all have a thickness of 0.15 mm (150 μm) and that the core layer is a conducting metal foil having a conductivity of $5\times10^5$ S/cm. The three layers may be considered as being connected in series electrically. Then, a simple calculation would predict that the thickness-direction conductivity of the resulting laminate is approximately 22.5 S/cm, lower than the DOE requirement. FIG. 1 shows the thickness-direction conductivity of the laminate plotted as a function of the thickness-direction conductivity of flexible graphite layers. The diagram indicates that the thickness-direction conductivity of the three-layer laminate will exceed 100 S/cm if the FG layers have a thickness-direction conductivity greater than 67 S/cm. Prior art flexible graphite sheets fall short of this conductivity level.

Alternatively, Mercuri, et al. (e.g., U.S. Pat. No. 5,885,728, Mar. 23, 1999 and U.S. Pat. No. 6,037,074, Mar. 14, 2000) disclosed a flexible graphite sheet having embedded ceramic or glass fibers extending from its surface into the sheet to increase the resin permeability of the sheet for the preparation of a resin-impregnated flexible graphite bipolar plate. By allowing ceramic or glass fibers to puncture through layers of exfoliated graphite also leave these layers vulnerable to gas permeation, thereby significantly reducing the hydrogen and oxygen permeation resistance of a bipolar plate and increasing the chance of dangerous mixing of hydrogen and oxygen inside a fuel cell stack.

What follows is a summary of the state of the art of the flexible graphite sheet, resin-impregnated expanded graphite composite, resin-impregnated flexible graphite sheet composite, and methods of producing these materials:

Olstowski, et al. ("Novel Compressed Cohered Graphite Structures and Method of Preparing Same," U.S. Pat. No. 3,492,197, Jan. 27, 1970) provided compressed and resin-bonded forms of expanded vermicular graphite. The resin-bonded composite is obtained by (a) providing a supply of an expanded vermicular graphite having an apparent bulk density of 0.2-2.0 pounds per cubic foot; (b) providing a supply of a bonding agent; (c) blending the expanded vermicular graphite and bonding agent in an amount of 2-35 weight percent bonding agent based on the total weight of the expanded graphite-bonding agent mixture; (d) compressing the mixture at a pressure of 5-50,000 psi in predetermined directions into predetermined forms of cohered graphite; and (e) treating the so-formed composite to activate the bonding agent thereby promoting adhesion within the compact. This invention taught about compressing vermicular-bonding agent mixture in a uniaxial direction to produce a highly anisotropic composite and in bi-axial, tri-axial, cylinder-radial, and isostatic directions to produce less anisotropic or more isotropic composites. However, it failed to teach, implicitly or explicitly, how a desired degree of isotropy could be maintained when the bi-axially, tri-axially, cylinder-radially, and isostatically compressed composite compacts (prior to curing or fusing to consolidate) were re-compressed or molded as a final operation to become a thin composite plate. This thin plate (thinner than 5 mm, preferably thinner than 3 mm, further preferably thinner than 1 mm, and most preferably thinner than 0.5 mm) is for a bipolar plate application. Further, this patent was limited to using a solid bonding agent to begin with the blending process, excluding liquid polymers from the invention due to the perceived notion that these liquid polymers "can prevent formation of highly densified composites." This patent did not teach how bi-axial, tri-axial, cylinder-radial, and isostatic compressions could be accomplished in a real manufacturing environment for the mass production of less anisotropic composites on a continuous basis. Furthermore, the method disclosed in this patent entailed first exfoliating graphite to obtain graphite worms and then mixing graphite worms with a bonding agent in a fine solid powder form. Once the graphite worms are formed, it would be very difficult to mix the worms with fine solid particles in a homogeneous manner without breaking up or significantly disturbing the continuous network of electron-transport paths (interconnected graphite flakes).

Caines ("Vermicular Expanded Graphite Composite Materials," U.S. Pat. No. 4,265,952, May 5, 1981) disclosed an expanded graphite composite containing a corrosion resistant resin (e.g., polytetrafluoroethylene, PTFE). The composite was prepared by blending vermicular graphite with a suspension of fine solid resin particles in a carrier liquid medium, vaporizing the carrier, and heating the composite material to sinter the resin. No electrical property of the resulting composite was reported.

Atkinson, et al. ("Housing for Electrical or Electronic Equipment," U.S. Pat. No. 4,530,949, Jul. 23, 1985) provided a low-density composite composition consisting of exfoliated graphite and a thermosetting resin binder. The density (<0.1 gm/cm$^3$) and the electrical conductivity (0.1 S/cm) values are relatively low.

Fukuda, et al. ("Reinforced Flexible Graphite Sheet," U.S. Pat. No. 4,729,910, Mar. 8, 1988) disclosed a process of producing thermosetting resin reinforced flexible graphite sheets. The process involved subjecting both the flexible graphite sheet and a phenolic resin solution to a preliminary de-aeration treatment prior to immersing the flexible graphite sheet in the resin solution. No electrical conductivity data was offered.

Chung provided a low-density (0.7 gm/cm$^3$) exfoliated flexible graphite flake-reinforced composite with a conductivity of 2 S/cm (Chung, "Low-Density Graphite-Polymer Electrical Conductor," U.S. Pat. No. 4,704,231, Nov. 3, 1987). Chung also provided an in-situ exfoliation method of producing graphite flake-reinforced epoxy composites ("Composites of In-Situ Exfoliated Graphite," U.S. Pat. No. 4,946,892, Aug. 7, 1990).

Fong, et al. ("Methacrylate Impregnated Carbonaceous Parts," U.S. patent application Ser. No. 09/896,178, filed on Jun. 29, 2001 (Pub. No. US 2001/0046560, Pub date Nov. 29, 2001)) disclosed a method of impregnating a highly porous carbon material with a methacrylate polymer. No electrical conductivity data was provided.

Öttinger, et al. ("Impregnated Bodies Made of Expanded Graphite, Process for Producing Such Bodies and Sealing Elements, Fuel Cell Components and Heat-Conducting Elements Formed of the Bodies," U.S. Pat. No. 6,746,771, Jun. 8, 2004) provided composites of expanded graphite impregnated with isocyanate or epoxy resins. The method involved soaking expanded graphite with a low-viscosity, polymerizing resin. The achievable electrical conductivity of the resulting composites appears to be in the range of 2-10 S/cm.

Da Silva, et al. ("Method for Producing Composite Objects Using Expanded Graphite and Vermiculite," U.S. patent application Ser. No. 10/574,803 filed on Oct. 8, 2004 (Pub. No. US 2007/0015267, Pub date Jan. 18, 2007)) disclosed a method of producing s composite object consisting of at least two distinct parts.

Mercuri, et al. ("Flexible Graphite Article and Method of Manufacture," U.S. Pat. No. 6,432,336, Aug. 13, 2002 and U.S. Pat. No. 6,706,400, Mar. 16, 2004) disclosed a resin-impregnated flexible graphite sheet exhibiting enhanced isotropy and a method of producing resin-impregnated flexible graphite sheet. The method includes the steps of (i) reacting raw natural graphite flake-like particles with a liquid intercalant solution to form intercalated graphite particles; (ii) exposing the intercalated graphite particles to a temperature of at least about 700° C. to expand the intercalated graphite particles to form a stream of exfoliated graphite particles; (iii) continuously compressing the stream of exfoliated graphite particles into a continuous coherent self-supporting mat of flexible graphite; (iv) continuously contacting the flexible graphite mat with liquid resin and impregnating the mat with liquid resin; and (v) continuously calendering the flexible graphite mat to increase the density thereof to form a continuous flexible graphite sheet having a thickness of no more than about 1.0 inch.

It is of interest to note that this process disclosed by Mercuri, et al. involves compressing the exfoliated graphite into a flat mat prior to impregnating the mat with a resin. This sequence is disadvantageous in that the re-compressed flexible graphite, being much denser, is less permeable to resin impregnation. Furthermore, uniaxial re-compression of the exfoliated graphite prior to resin impregnation tends to align or orientate the graphite flakes along the graphite sheet plane direction (perpendicular to the re-compression vector), resulting in a more anisotropic flexible graphite sheet composite. Once these flakes were well-aligned in a sheet to form a highly cohered mat, their orientations could no longer be changed during subsequent resin impregnation and molding operations. Furthermore, no attempt was made to re-compress the mat in different directions. Thin graphite flakes are essentially single crystals with the flake plane parallel to the basal plane and, hence, exhibit a high electrical conductivity along thin flake plane directions and much lower conductivity along the thickness direction, or c-axis direction. Consequently, the bipolar plates prepared by using the Mercuri process are not expected to have a high thickness-direction conductivity.

The resin-impregnated flexible graphite sheet exhibiting enhanced isotropy as disclosed by Mercuri, et al. (U.S. Pat. No. 6,706,400) was said to contain interlocked particles of expanded graphite. A portion of these interlocked particles of expanded graphite was substantially unaligned with the opposed planar surfaces. However, Mercuri, et al. did not fairly specify how these unaligned graphite flakes were obtained. Presumably, this could be achieved by mixing large particles of exfoliated graphite with smaller particles of exfoliated graphite, as implied in a Mercuri's earlier patent (U.S. Pat. No. 5,846,459, Dec. 8, 1998). The trade literature published by GrafTech (assignee of Mercuri's patents) indicates the electrical resistivity of bipolar plates in the X-Y plane as 7 μOhm-m (in-plane conductivity=1428 S/cm) and in the Z-direction as 300 μOhm-m (thickness-direction conductivity=33 S/cm). The thickness-direction conductivity is unsatisfactory.

In addition to exhibiting high electrical conductivity, the flow field plate or bipolar plate should be constructed from inexpensive starting materials, materials that are easily formed into any plate configuration, preferably using a continuous molding process, and materials that are corrosion resistant in low temperature fuel cells and that do not require further processing such as high temperature pyrolyzation treatments. The above review clearly indicates that prior art bipolar plate material compositions and processes have not provided a satisfactory solution for the fuel cell industry.

In our earlier applications, we disclosed a sheet molding compound (SMC) composition particularly for use as a fuel cell flow field plate or bipolar plate [Bor Z. Jang, "Sheet Molding Compound Flow Field Plate, Bipolar Plate and Fuel Cell," U.S. patent application Ser. No. 11/293,540 (Dec. 5, 2005) and Bor Z. Jang, A. Zhamu, Lulu Song, "Method for Producing Highly Conductive Sheet Molding Compound, Fuel cell Flow Field Plate, and Bipolar Plate," U.S. patent application Ser. No. 11/293,541 (Dec. 5, 2005)]. In one preferred embodiment, the SMC composition comprises a top FG sheet, a bottom FG sheet, and a nano filler-resin mixture sandwiched between the top sheet and the bottom sheet. The flexible graphite sheet has a planar outer surface having formed therein a fluid flow channel. The nano filler-resin mixture comprises a thermoset resin and a conductive nano filler (e.g., nano graphene plates or graphitic nano fibers) present in a sufficient quantity to render the SMC composition electrically conductive enough to be a current collector material. When the resin is cured or solidified, the two sheets are well bonded by the resin to provide good structural integrity to the resulting "laminated" structure.

Again, assume that the top layer, bottom layer, and core layer of the three-layer laminate all have a thickness of 0.15 mm (150 μm) and that the core layer is a conducting nanocomposite having a conductivity of 100 S/cm. The three layers may be considered as being connected in series electrically. FIG. 2 shows the thickness-direction conductivity of the laminated SMC plotted as a function of the thickness-direction conductivity of the flexible graphite layers. The diagram indicates that the thickness-direction conductivity of the SMC will exceed 100 S/cm if the FG layers have a thickness-direction conductivity greater than 100 S/cm. Hence, it is highly desirable to have flexible graphite sheets having a high thickness-direction conductivity. However, conventional flexible graphite normally has a thickness-direction conductivity less than 15 S/cm.

Accordingly, an object of the present invention is to provide an exfoliated graphite composition that exhibits a relatively high thickness-direction conductivity, preferably greater than 35 S/cm, more preferably greater than 67 S/cm, most preferably greater than 100 S/cm.

Another object of the present invention is to provide an exfoliated graphite composition that can be easily molded or embossed into a flow field plate, bipolar plate, or current collector.

Still another object of the present invention is to provide an exfoliated graphite article that is intrinsically less anisotropic.

Yet another object of the present invention is to provide a process for producing exfoliated graphite articles with enhanced isotropy. Such a process can be continuous, automated, and adaptable for mass production of bipolar plates.

SUMMARY OF THE INVENTION

This invention provides an electrically conductive, less anisotropic, recompressed exfoliated graphite article comprising a mixture of (a) expanded or exfoliated graphite flakes; and (b) particles of non-expandable graphite or carbon, wherein the non-expandable graphite or carbon particles are in the amount of between about 3% and about 70% by weight based on the total weight of the particles and the expanded graphite flakes combined; wherein the mixture is compressed to form the article having an apparent bulk density of from about 0.1 g/cm$^3$ to about 2.0 g/cm$^3$. The article exhibits a thickness-direction conductivity typically greater than 50 S/cm, more typically greater than 100 S/cm, and most typically greater than 200 S/cm. The article, when used in a thin foil or sheet form, can be a useful component in a sheet molding compound plate used as a fuel cell separator or flow field plate. This article can also be a separator or current collector in a battery, supercapacitor, and any other electrochemical cell.

The non-expandable graphite or carbon is selected from natural graphite, synthetical graphite, highly oriented pyrolytic graphite, graphite oxide, graphite fluoride, chemically modified graphite, spheroidal graphite, meso-carbon micro-bead, carbon black, activated carbon, or a combination thereof. They are preferably more or less spherical or symmetrical in shape and preferably highly conducting.

The non-expandable graphite or carbon may be accompanied by a reinforcement or filler selected from the group consisting of graphite or carbon fiber, graphite or carbon nano-fiber, nano-tube, glass fiber, ceramic fiber, polymer fiber, metal fiber, metal particle, polymer particle, organic particle, inorganic particle, or a combination thereof, wherein the reinforcement or filler is between 0.5% and 30% by weight based on the total weight of the expanded graphite, particles of non-expanded graphite or carbon, and reinforcement or filler. This additional reinforcement or filler component imparts additional properties (e.g., stiffness or strength) or characteristics to the re-compressed graphite article.

It may be noted that the US Department of Energy (DOE) target for composite bipolar plates includes a bulk electrical conductivity of 100 S/cm or an areal conductivity of 200 S/cm$^2$, where the areal conductivity is essentially the ratio of the thickness-direction conductivity to the plate thickness.

This implies that a thinner plate has a higher areal conductivity, given the same thickness-direction conductivity. One of the advantages of the presently invented recompressed graphite composition is the notion that this composition can be prepared in such a manner that the resulting composite plate can be as thin as 0.3 mm, in sharp contrast to the conventional graphite bipolar plates which typically have a thickness of 3-5 mm. This, when coupled with the fact that bipolar plates typically occupy nearly 90% of the total fuel cell stack thickness, implies that our technology enables the fuel cell stack size to be reduced dramatically. The resulting plates have electrical conductivities far exceeding the DOE target values, which was an original objective of the DOE-sponsored research and development work that resulted in the present invention.

The present invention is fundamentally and patently different from that of Mercuri (U.S. Pat. No. 5,846,459, Dec. 8, 1998). In Mercuri's method, smaller natural graphite and larger natural graphite flakes were mixed to form a mixture, which was then intercalated and exfoliated. The resulting mixture is comprised of larger exfoliated graphite worms and smaller exfoliated graphite worms, which mixture was passed through pressure rolls to form a coherent, roll pressed, compressed sheet formed of the blended mixture of pre-determined thickness. Although the degree of anisotropy was reduced, this reduction was insignificant. The smaller exfoliated particles, being flexible or non-rigid worms, appeared to be relatively ineffective in promoting isotropy or improving thickness-direction conductivity. As a result, the thickness-direction conductivity of a flexible graphite sheet was increased from 0.95 S/cm (for the sample of 0% smaller starting graphite particles) to only 1.92 S/cm (for the sample containing 25% smaller starting graphite particles) and 3.57 S/cm (75% smaller starting graphite particles). Clearly, these conductivity values are too small. By contrast, in our instant invention, non-expandable graphite particles are mixed with expanded graphite to form a mixture, which is then compressed in one to three predetermined directions to obtain an article (e.g., a sheet). The non-expandable graphite particles are more rigid and more electrically conducting compared with those worms derived from smaller starting graphite particles. Consequently, the re-compressed exfoliated graphite article is much more isotropic, and more electrically conducting in the thickness direction, with the conductivity typically in the range of 35-650 S/cm and more typically in the range of 100-350 S/cm.

DETAILED DESCRIPTION OF THE INVENTION

Figure 1:
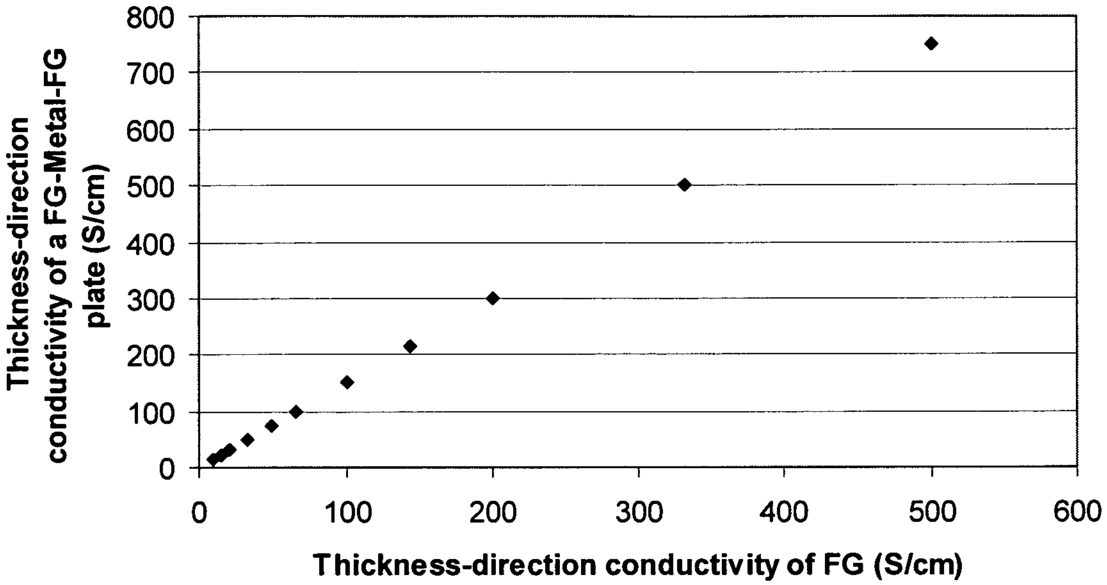
FIG. 1: Predicted thickness-direction conductivity of a FG-metal-FG laminate plotted as a function of the thickness-direction conductivity of the FG layers. This is used to illustrate the significance of having a top and bottom layer (in a three-layer laminate) with a high thickness-direction conductivity.
Figure 2:
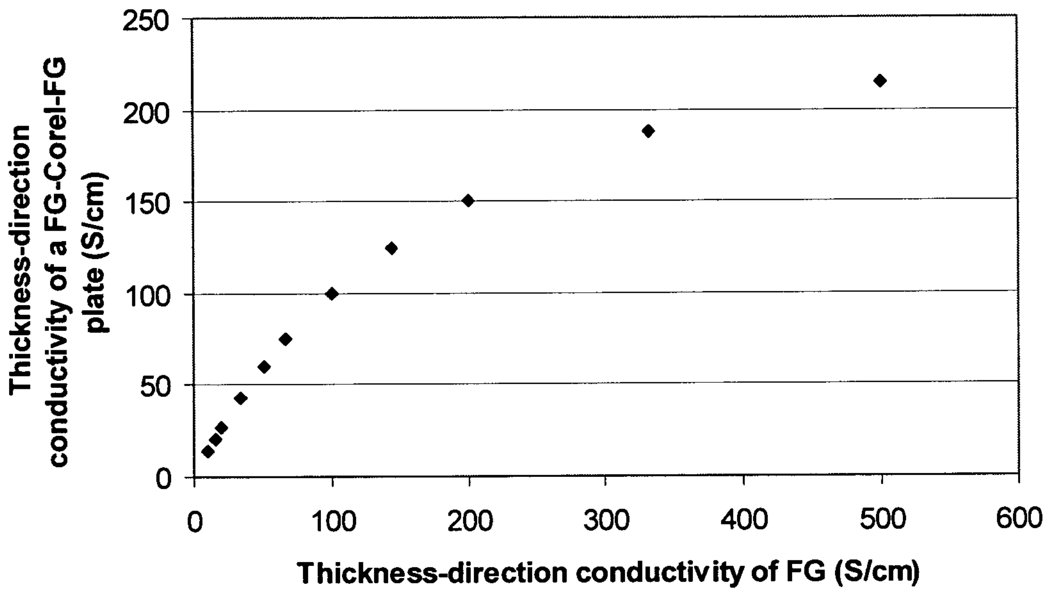
FIG. 2: Predicted thickness-direction conductivity of a FG-nanocomposite-FG sheet molding compound (SMC) laminate plotted as a function of the thickness-direction conductivity of the FG layers. This is used to illustrate the significance of having a top and bottom layer (in a three-layer SMC) with a high thickness-direction conductivity.
Figure 3A:
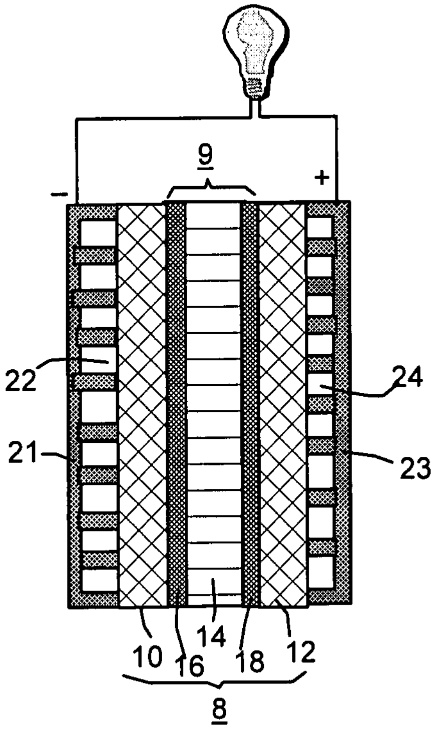
FIG.3(a) (Prior Art)
FIG. 3: (A) A sectional view of a prior art PEM fuel cell consisting of a membrane electrode assembly (MEA) sandwiched between two flow field plates 21, 23; and (B) A sectional view of a fuel cell stack consisting of two fuel cell units connected in series through a bipolar plate 19.

A prior art fuel cell, as schematically shown in FIG. 3(A), typically comprises a membrane electrode assembly 8, which comprises a proton exchange membrane 14 (PEM), an anode backing layer 10 connected to one face of the PEM 14, and a cathode backing layer 12 connected to the opposite face of PEM 14. Anode backing layer 10 is also referred to as a fluid diffusion layer or diffuser, typically made of carbon paper or carbon cloth. A platinum/ruthenium electro-catalytic film 16 is positioned at the interface between the anode backing layer and PEM 14 for promoting oxidation of the methanol fuel. Similarly, at the cathode side, there are a backing layer or diffuser 12 (e.g., carbon paper or carbon cloth) and a platinum electro-catalytic film 18 positioned at the interface between the cathode backing layer and PEM 14 for promoting reduction of the oxidant.

In practice, the proton exchange membrane in a PEM-based fuel cell is typically coated on both sides with a catalyst (e.g., Pt/Ru or Pt) to form a catalyst-coated membrane 9 (CCM). The CCM layer 9 is then sandwiched between an anode backing layer 10 (diffuser) and a cathode backing layer 12 (diffuser). The resulting five-layer assembly is called a membrane electrode assembly 8 (MEA). Although some fuel cell workers sometimes refer to CCM as a MEA, we prefer to take the MEA to mean a five-layer configuration: anode backing layer, anode catalyst layer, PEM, cathode catalyst layer, and cathode backing layer.

The fuel cell also comprises a pair of fluid distribution plates (also referred to as fluid flow field plates) 21 and 23, which are positioned on opposite sides of membrane electrode assembly 8. Plate 21, which serves as a fuel distribution plate, is shaped to define fuel flow channels 22 facing towards anode diffuser 10. Channels 22 are designed to uniformly deliver the fuel to the diffuser, which transports the fuel to the anode catalyst layer 16. An input port and an output port (not shown), being in fluid communication with channels 22, may also be provided in flow field plate 21 so that carbon dioxide (in a DMFC) can be withdrawn from channels 22.

Figure 3B:
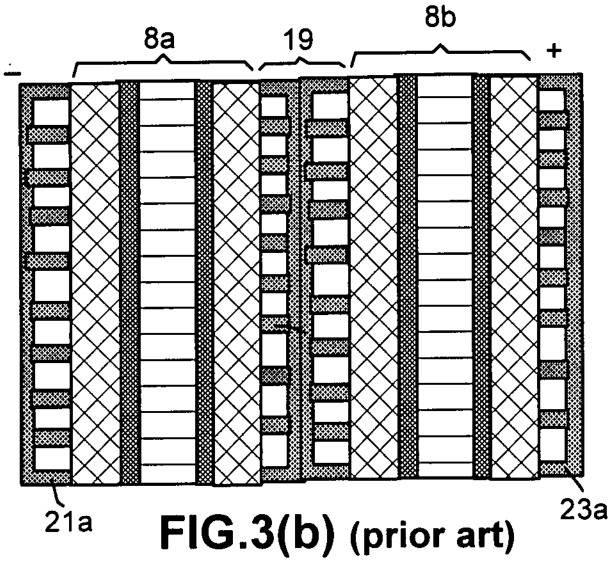
FIG.3(b) (prior art)

Flow field plate 23 is shaped to include fluid channels 24 for passage of a quantity of gaseous oxygen (or air). An input port and an output port (not shown) are provided in plate 23, which are in fluid communication with channels 24 so that oxygen (or air) can be transported through the input port to the cathode diffuser 12 and cathode catalyst layer 18, and water and excess oxygen (or air) can be withdrawn from channels 24 through the output port. Plate 23 is electrically conductive and in electrical contact with cathode diffuser 12. It can be used as a uni-polar plate (the positive terminal of the electrical current generated by the fuel cell unit) or as a part of a bi-polar plate (if integrated with fuel flow field plate 21). Shown in FIG. 3(B) is a fuel cell stack that consists of two fuel cell units. On the two opposite sides of the stack are two separate flow field plates 21*a*, 23*a*. Between the two MEAs (8*a* and 8*b*) is a bipolar plate 19, which can be viewed as two flow field plates integrated into one single component.

As indicated earlier, bipolar plates can be made from an electrically conductive flexible graphite sheet (FG), which is then impregnated with a resin (e.g., Mercuri, et al., U.S. Pat. No. 6,432,336, Aug. 13, 2002 and U.S. Pat. No. 6,706,400, Mar. 16, 2004). Flexible graphite sheets may also be used in a prior art FG-metal-FG laminate (e.g., Wilkinson, et al., U.S. Pat. No. 5,527,363) or a FG-nanocomposite-FG SMC configuration (e.g., in our earlier inventions, U.S. patent application Ser. No. 11/293,540 (Dec. 5, 2005) and U.S. Pat. No. 11/293,541 (Dec. 5, 2005)). Flexible graphite sheets are compressible and embossing processes may be used to form flow field channels in one or both major surfaces of a sheet. Conventionally, flexible graphite is obtained first by intercalating graphite with an intercalating agent (also referred to as an intercalate or intercalant) to form a graphite intercalation compound (GIC). Then, the GIC is exposed to a thermal shock at a temperature of 700-1,050° C. for a short duration of time (typically 20-60 seconds) to expand or exfoliate graphite. The exfoliation is characterized by an expansion of graphite particles up to a ratio of typically 80-300 times in the c-axis direction perpendicular to the graphene or basal plane of the graphite crystal structure. The exfoliated graphite particles are vermiform in appearance, and are therefore commonly referred to as worms. The worms may be re-compressed together into flexible sheets which are characterized by having most of the exfoliated graphite flakes oriented parallel to the two opposed exterior surfaces, which are substantially perpendicular to the c-axis. These thin sheets (foils or films) are referred to as flexible graphite. Flexible graphite can be wound up on a drum to form a roll of thin film, just like a roll of thin plastic film or paper. Although a flexible graphite sheet is typically highly conductive along the sheet plane directions, their thickness-direction conductivity is rather poor (reported to be up to approximately 15 S/cm).

The present invention provides a highly conductive, less anisotropic re-compressed graphite composition or article (e.g., in the form of flexible graphite sheets sandwiching either a thin metal sheet or nanocomposite core layer), which can be easily embossed to form flow field channels to make a bipolar plate. The resulting composite plates exhibit a thickness-direction conductivity typically much greater than 35 S/cm, more typically greater than 100 S/cm, often greater than 200 S/cm, and in many cases, greater than 300 S/cm. These impressive conductivity values hitherto have not been known to be achievable with prior art flexible graphite sheets or resin-impregnated flexible graphite composites.

In one preferred embodiment, the invented composition comprises a mixture of (a) expanded or exfoliated graphite flakes; and (b) particles of non-expandable graphite or carbon, wherein the non-expandable graphite or carbon particles are in the amount of between about 3% and about 70% by weight based on the total weight of the particles and the expanded graphite flakes combined; wherein the mixture is compressed to form the article having an apparent bulk density of from about 0.1 g/cm$^3$ to about 2.0 g/cm$^3$ (more typically in the range of about 0.5 g/cm$^3$ to about 1.8 g/cm$^3$). It may be noted that the exfoliated graphite in the instant invention may comprise exfoliated versions of natural graphite, synthetical graphite, highly oriented pyrolytic graphite, spheroidal graphite, meso-carbon micro-bead, graphite fiber, graphitic nano-fiber, graphite oxide, graphite fluoride, chemically modified graphite, or a combination thereof. These graphitic materials form a laminar or layered structure and can be intercalated and exfoliated.

We have surprisingly found that the presence of non-expandable graphite particles (whether larger or smaller than the exfoliated flake sizes) effectively promotes or facilitates more isotropic orientations of exfoliated worm flakes, resulting in a much higher thickness-direction conductivity, typically much greater than 100 S/cm. This is a highly desirable feature of a bipolar plate since electrons produced by a fuel cell stack flow along this direction. This increase in thickness-direction conductivity is achieved with a slightly reduced in-plane conductivity, which is still very high (500-2,000 S/cm). The slight reduction in the in-plane conductivity is not a concern for fuel cell bipolar plate applications.

The composition can further comprise a reinforcement or filler selected from the group consisting of graphite/carbon fiber, graphite/carbon nano-fiber, nano-tube, glass fiber, ceramic fiber, polymer fiber, metal fiber, metal particle, polymer particle, organic particle, inorganic particle, or a combination thereof, wherein the reinforcement or filler is between 0.5% and 30% by weight based on the total weight of expanded graphite, particles of non-expanded graphite or carbon, and reinforcement or filler. In addition to serving as an isotropy-promoting agent, this reinforcement or filler can impart other desired properties to the resulting exfoliated graphite mixture. The reinforcement or filler is preferably electrically conductive (e.g., graphite fiber). Although ceramic or glass fibers were incorporated in a prior art resin-impregnated flexible graphite sheet composite, these stiff fibers were used solely or primarily for the purpose of puncturing the exfoliated graphite flakes to enhance resin impregnation (Mercuri, et al., U.S. Pat. No. 5,885,728, Mar. 23, 1999 and U.S. Pat. No. 6,037,074, Mar. 14, 2000). Furthermore, these fibers were not electrically conductive and, hence, could reduce the electrical conductivity of the flexible graphite sheet and its resin-impregnated version. It may be further noted that Mercuri (U.S. Pat. No. 5,846,459, Dec. 8, 1998) did suggest that an amount of exfoliated graphite from starting natural graphite flakes of smaller dimensions could be mixed with exfoliated graphite from starting natural graphite flakes of larger sizes to enhance the isotropy of flexible graphite sheets. However, as indicated earlier, the best available data indicate a thickness-direction conductivity of only 3.57 S/cm. Further, it was not clear if this approach could be adapted to effectively improve the isotropy in the resin-impregnated flexible graphite sheet composite. The best available data published by GrafTech (assignee of Mercuri's patents) indicates a thickness-direction conductivity of 33 S/cm, which is not very impressive. These data seem to suggest that thin flakes of exfoliated graphite are not very effective in enhancing electrical conductivity isotropy of the resulting flexible graphite sheet or resin-impregnated flexible graphite sheet.

The presently invented composition and article (e.g., the final bipolar plate) can be produced by several unique and effective methods. As one example (Approach 1), schematically shown on the right-hand side of FIG. 4(*a*), a method of producing an electrically conductive composite composition includes the following steps: (a) providing a supply of expandable graphite powder; (b) providing a supply of non-expandable graphite or carbon powder component; (c) blending the expandable graphite with the non-expandable powder component to form a powder mixture wherein the non-expandable powder component is in the amount of between 3% and 70% by weight based on the total weight of the powder mixture; (d) exposing the powder mixture to a temperature sufficient for exfoliating the expandable graphite to obtain a compressible mixture comprising expanded graphite worms and the non-expandable component; and (e) compressing the compressible mixture at a pressure within the range of from about 5 psi to about 50,000 psi in predetermined directions into predetermined forms of cohered graphite composite compact.

In this method, step (e) may comprise an uniaxial compression, a biaxial compression, a triaxial compression, and/or an isostatic compression. An uniaxial compression alone tends to produce a more anisotropic composite. A biaxial, triaxial, or isostatic compression, or a combination of two mutually perpendicular compression operations executed in sequence, produces a composition with reduced anisotropy. Hence, as a preferred embodiment of the present invention, the mixture composition preferably is prescribed to go through an uniaxial operation in a first direction to obtain a cohered body, which is then subjected to a compression operation in a second direction different than the first direction (preferably perpendicular to the first direction). This second operation may comprise a compression by pressure rolls to form a sheet-like structure. As another preferred embodiment of the present invention, the mixture composition may be prescribed to go through a biaxial, triaxial, and/or isostatic compression, prior to a final shaping operation to obtain a bipolar plate. This final shaping operation can involve an uniaxial compression, shearing, impression, embossing, compression molding, or a combination thereof. This operation results in the formation of a flow field plate or bipolar plate typically with flow field channels built onto at least one surface of the plate. The plate is preferably thin, smaller than 1 mm and more preferably thinner than 0.5 mm. This final operation typically involves a combination of uniaxial compression and some shearing, which could bring the final composite plate back to a less isotropic state (as compared to the composition prior to this final shaping operation). We have surprisingly found that the presence of a non-expandable powder component (e.g., fine particles of natural graphite) serves to eliminate or reduce this further anisotropy induced by the final shaping operation. This is a non-trial and non-obvious discovery, achieved only after extensive, in-depth research and development efforts.

By contrast, a prior art method of producing exfoliated graphite composites (Olstowski, et al. U.S. Pat. No. 3,492,197), schematically shown on the left-hand side of FIG. 4(*a*), includes (a) providing a supply of an expanded vermicular graphite having an apparent bulk density of 0.2-2.0 pounds per cubic foot; (b) providing a supply of a bonding agent; (c) blending the expanded vermicular graphite and bonding agent in an amount of 2-35 weight percent bonding agent based on the total weight of the expanded graphite-bonding agent mixture; (d) compressing the mixture at a pressure of 5-50,000 psi in predetermined directions into predetermined forms of cohered graphite; and (e) treating the so-formed composite to activate the bonding agent thereby promoting adhesion within the compact. This prior art method patently differs from our method (Approach 1 in FIG. 4(*a*)) in the following ways:

(1) Olstowski's method entails the utilization of already-exfoliated vermicular graphite worms and blending the worms with a bonding agent (a binder material). Blending of a fine bonding agent powder with bulky vermicular graphite could be challenging. Presumably the vermicular graphite must have certain pore characteristics, e.g., corresponding to an apparent bulk density of 0.2-2.0 pounds per cubic foot (0.0032-0.032 g/cm$^3$), in order for the bonding agent to properly mix with the exfoliated graphite. By contrast, our Approach 1 involves first mixing expandable graphite (prior to expansion or exfoliation) with a non-expandable graphite or carbon component in a fine powder form. Since both ingredients are fine solid powders, they can be more uniformly mixed without difficulty. After exfoliation of the expandable graphite, the resulting mixture maintains a good distribution of the non-expandable powder component, such as un-intercalated natural graphite particles. Subsequent compression results in a composition of good mechanical integrity.

(2) Olstowski et al. did not use a non-expandable powder component, nor did they recognize the significance of this component in enhancing isotropy of the resulting composite. Although biaxial, triaxial, and isostatic compression were suggested as means of enhancing the isotropy, Olstowski, et al. did not know a non-expandable powder component could further increase the isotropy in the samples that were subjected to compressions in essentially all directions.

(3) The compression operations in predetermined directions were conducted by Olstowski, et al. on relatively thick samples just to prove that compressions in different directions produced varying degrees of anisotropy. They failed to recognize (or fairly suggest) that the formation of a thin bipolar plate from the exfoliated graphite mixture (with or without a binder), with or without prior compressions, will have to go through a final shaping operation for a specific application. This final shaping operation could involve an uniaxial compression and/or some shearing, which could bring the final composite plate back to a less isotropic state. The presence of a non-expandable powder component in our invention serves to eliminate or reduce this problem. The non-expandable powder may have a size larger or smaller than the flake particle size of the exfoliated graphite.

Figure 4A:
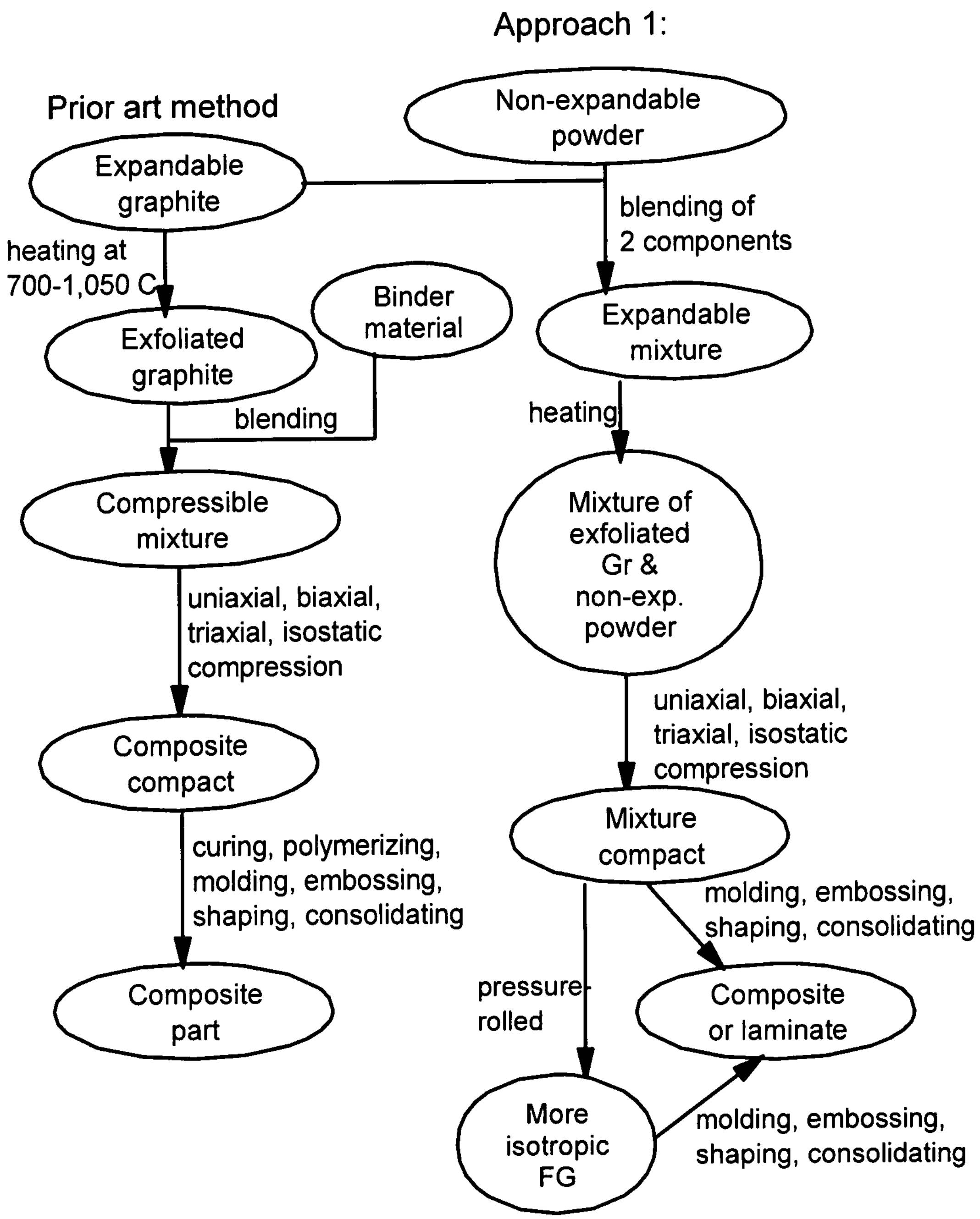
FIG. 4: (a) a flowchart to illustrate a prior art method (left portion) of producing exfoliated graphite composite and one preferred embodiment (right portion) of the presently invented method of producing a flexible graphite sheet; and (b) a second preferred embodiment of the invented method.
Figure 4B:
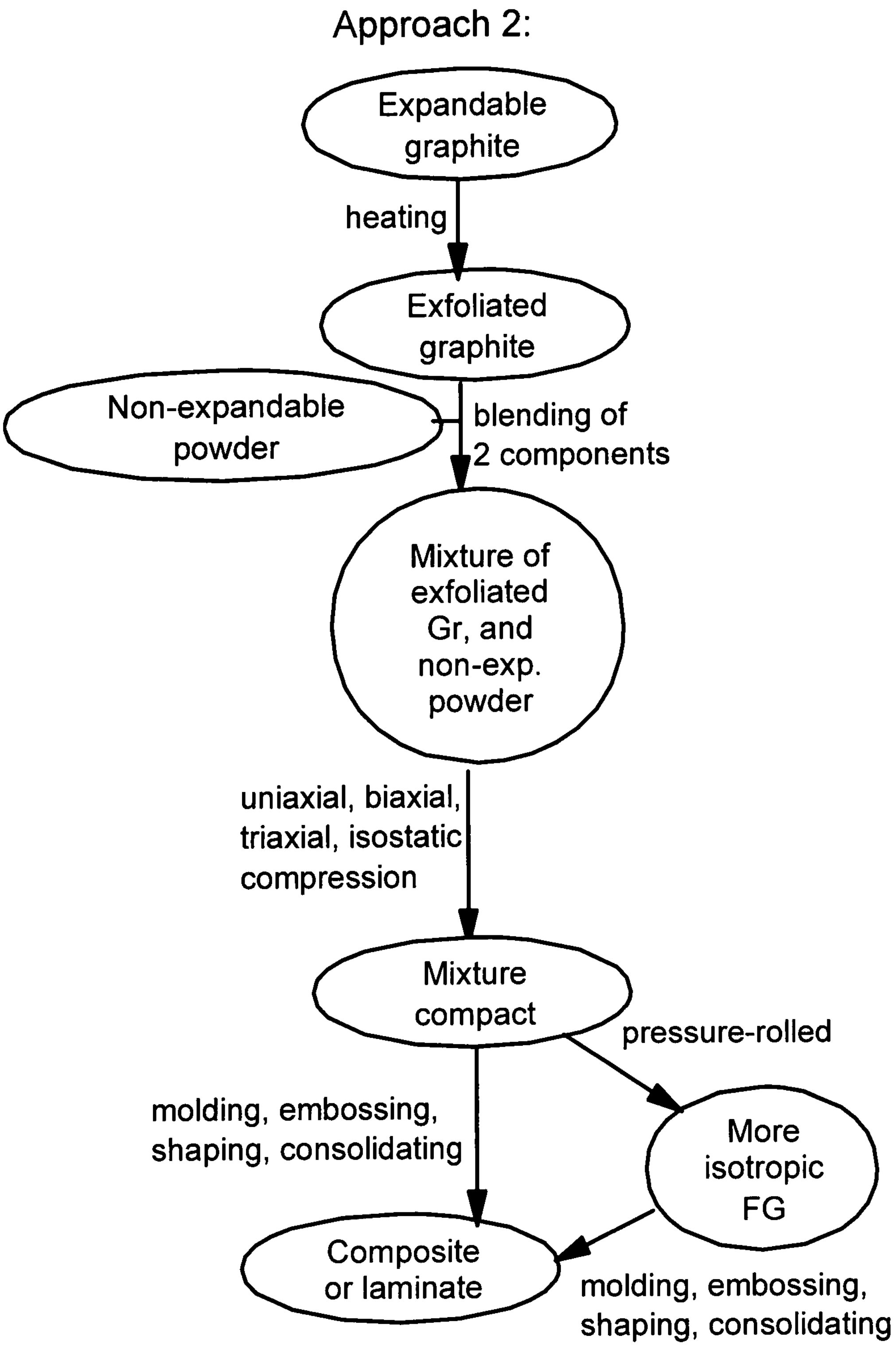

A second method (Approach 2) of producing an electrically conductive mixture composition is schematically shown in FIG. 4(*b*). This method is similar to Approach 1, but the non-expandable component in Approach 2 is added after exfoliation of expandable graphite. The method comprises: (a) providing a supply of expandable graphite powder; (b) exfoliating the expandable graphite powder to obtain graphite worms or expanded graphite; (c) providing a supply of an isotropy-promoting, non-expandable graphite/carbon powder component; (d) blending the expanded graphite or worms with the non-expandable powder component to form a mixture wherein the non-expandable powder component is between 3% and 70% by weight based on the total weight of the mixture; and (e) compressing the compressible mixture at a pressure within the range of from about 5 psi ($3.5\times10^4$ Pa) to about 50,000 psi (approximately 350 MPa) in predetermined directions into predetermined forms of cohered graphite compact. Optionally, the so-formed cohered graphite compact is subjected to a final shaping operation to obtain an article such as a bipolar plate. The apparent physical density of the resulting mixtures is typically in the range of from about 0.1 g/cm$^3$ to about 2.0 g/cm$^3$, more typically from about 0.5 g/cm$^3$ to about 1.8 g/cm$^3$.

Again, in this method, step (e) may comprise an uniaxial compression, a biaxial compression, a triaxial compression, an isostatic compression, or a cylindrically radial compression (compression in radial directions with no axial direction displacement). As a preferred embodiment of the present invention, the composition is subjected to a uniaxial compression (in a first direction), a biaxial, triaxial, or isostatic compression, prior to a final shaping operation to obtain a bipolar plate. This shaping operation can involve an uniaxial compression (in a second direction different than the first direction), calendering, shearing, impression, embossing, compression molding, or a combination thereof. This final shaping operation results in the formation of a flow field plate or bipolar plate typically with flow field channels built onto at least one surface of the plate. The plate is preferably smaller than 1 mm and more preferably thinner than 0.5 mm. Again, the presence of a non-expandable powder component (e.g., fine particles of natural graphite) serves to eliminate or reduce the further anisotropy induced by the final shaping operation.

Figure 5:
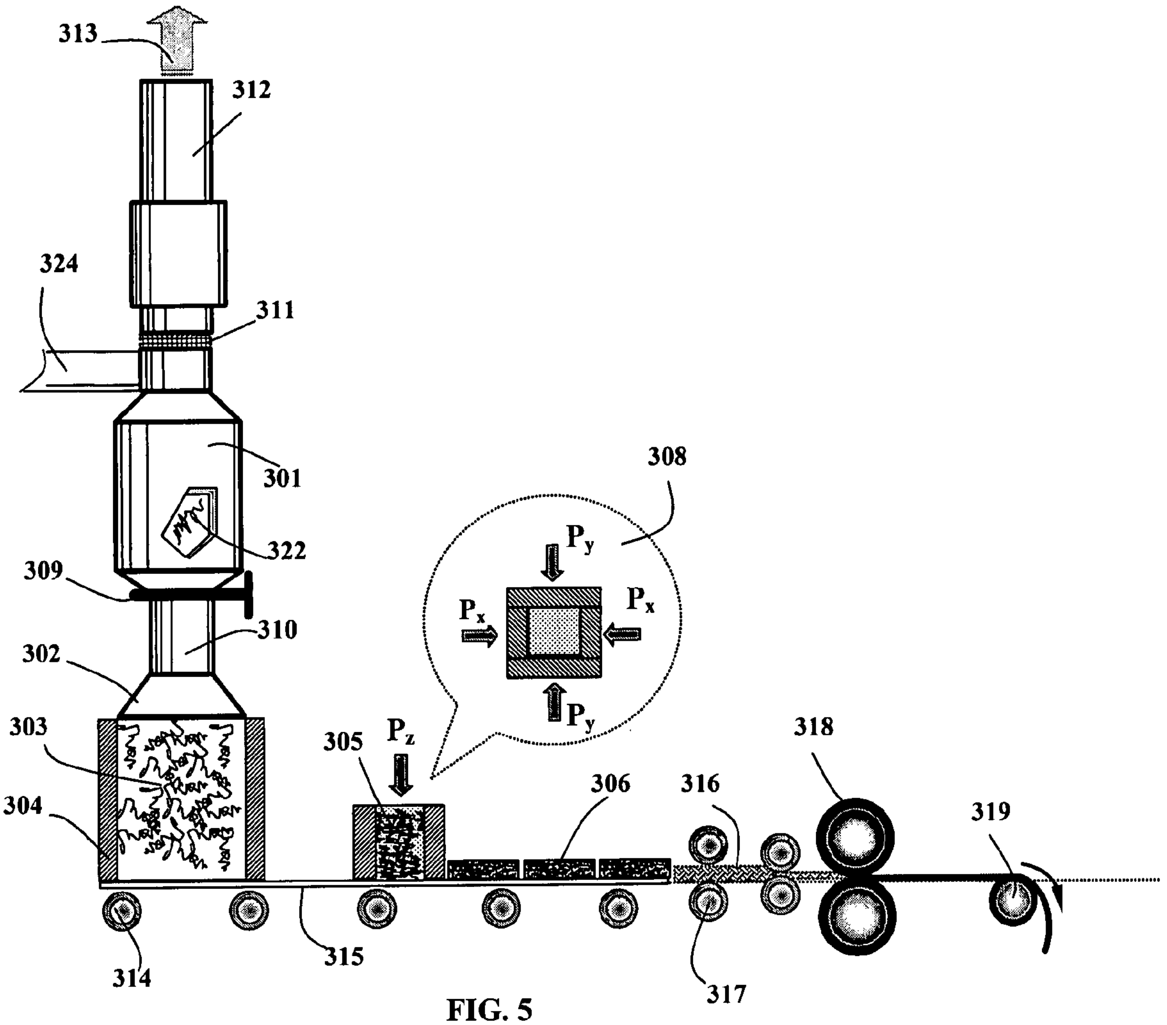
FIG. 5: Schematic of a continuous production system for manufacturing flexible graphite sheets as a component in fuel cell bipolar plates from raw materials such as expandable graphite and non-expandable powder. The surface flow channels of bipolar plates can be generated via in-line embossing or matched-die molding.

A continuous process for producing more isotropic flexible graphite sheets and exfoliated graphite-based articles (such as bipolar plates) may be further illustrated by referring to FIG. 5. The mixture 322 of the exfoliated graphite and the isotropy-promoting agent (non-expandable graphite, etc.) are transported through a conduit 324 via compressed air into a chamber 301. Exhaust air 313 permeates through a filter 311 and a pipe 312 into the outside atmosphere. The mixture 322 may be allowed to drop, on demand, through a control valve 309, a conduit 310, and a funnel or hopper 302 into a chamber of a compression device 304. The mixture 303 in this compression chamber is moved forward on a conveyor belt 315 driven by motorized rollers (e.g., 314). The mixture may be uniaxially compressed (e.g., along the Y-axis direction, defined to be the first compression vector). In FIG. 5, the X-axis direction is parallel to the conveyor belt movement direction and the Z-axis direction is vertical. Alternatively, the mixture may be biaxially compressed in both the X- and Y-axis directions (simultaneously or in sequence) to form a compact 305. The insert 308 of FIG. 5 shows the top view of a biaxial compression operation along the X- and Y-directions. The mixture compact is then fed into a pair of pressing rollers 317 and the resulting compressed compact 316 may be further compressed by a set of rollers 318 to form a flexible graphite sheet. These later operations are similar to the plastic sheet calendering process. The resulting flexible graphite sheet, which is relatively isotropic, may be taken up by a winding roller 319. The sheet is typically thinner than 2 mm and more typically thinner than 0.5 mm. It can be thinner than 0.2 mm.

Figure 6:
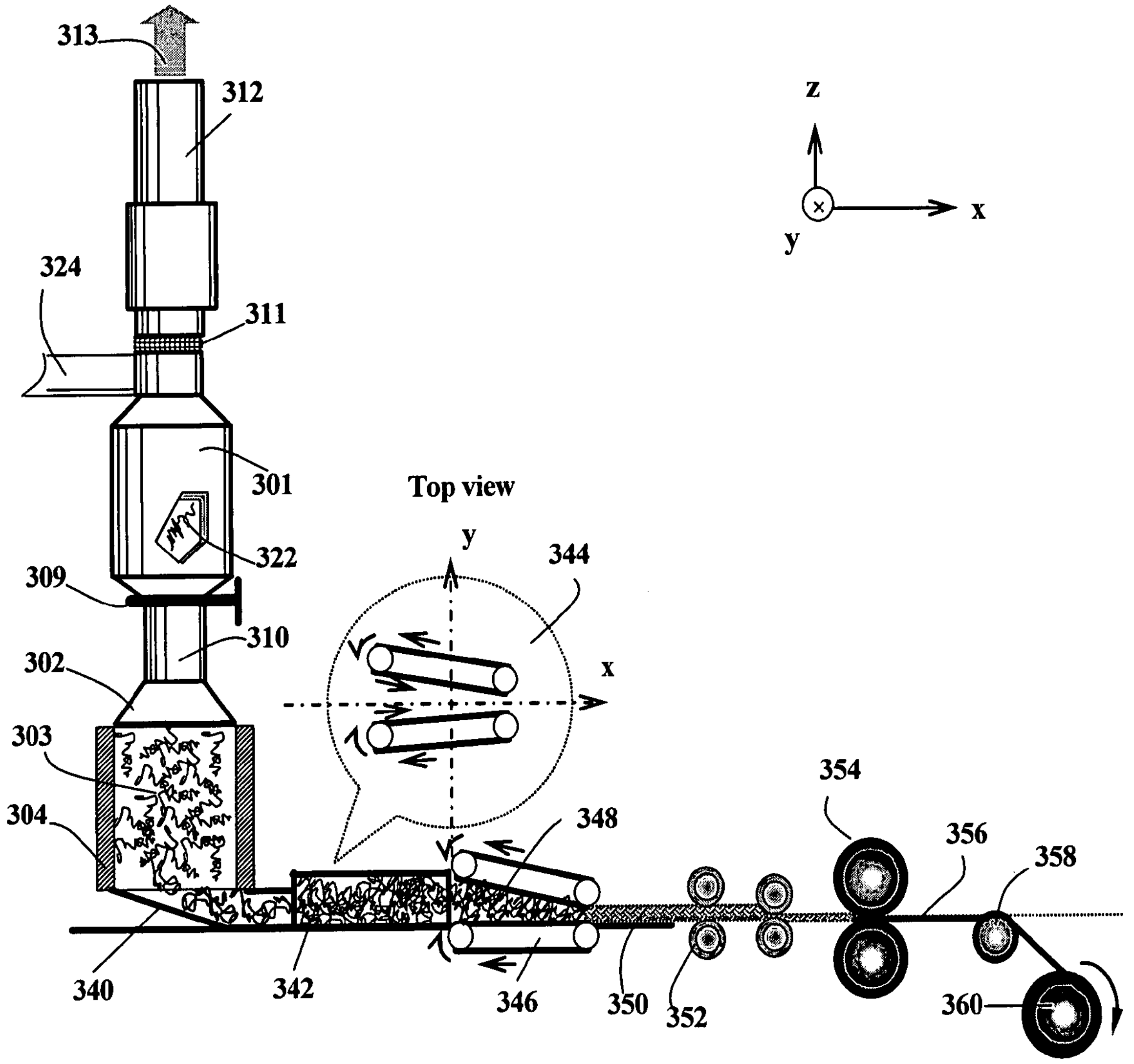
FIG. 6: Schematic of another continuous production system for manufacturing flexible graphite sheets as a component in fuel cell bipolar plates from raw materials such as expandable graphite and non-expandable powder. The surface flow channels of bipolar plates can be generated via in-line embossing or matched-die molding.

Alternatively, as schematically shown in FIG. 6, the mixture 303 of exfoliated worms (and other non-expandable ingredients) may come from a conduit 340 through a pair of moving belts 344 (having a gradually tapered space) that gradually compress the mixture 342 in the Y-direction (transverse direction), wherein the moving belt direction is defined as the X-direction. The pre-compressed worm mixture is then directed to go through another pair of moving belts 346 that gradually compress the pre-compressed worm mixture 348 in the Z-direction. The resulting compact 350 is fed into a set of rollers 352, 354 for further compression and final thickness control (much like a plastic film calendering operation). The resulting flexible graphite sheet 356 is then pulled over a roller 358 and collected on a winding roller 360. This is a continues mass-production process that can be automated. In addition, optionally or alternatively, the flexible graphite sheet 356 may combine with another similarly made flexible graphite sheet (not shown) to sandwich a layer of nanocomposite (containing an un-cured matrix resin) to form a three-layer sheet molding compound (not shown). The top and/or bottom surface of this SMC may be embossed to molded in-line to create surface flow filed channels.

Two of such more isotropic FG sheets may be used to sandwich a thin metal sheet or nanocomposite sheet to form a three-layer structure, and then fed embossed or molded into a bipolar plate. This final shaping operation involves an uniaxial compression in the Z-axis direction, possibly with some shearing. This process can be automated for the mass production of bipolar plates. The composition of the present invention may also be used as a fuel cell separator or current collector, or as a current collector for a supercapacitor, battery, or any electrochemical cell due to its high thickness-direction electrical conductivity.

In summary, a preferred method for recompressing expanded or exfoliated graphite to produce a flexible graphite foil, having a thickness-direction electrical conductivity no less than 15 S/cm, may comprise: (a) providing a mixture of expanded or exfoliated graphite flakes and particles of non-expandable graphite or carbon, wherein the non-expandable graphite or carbon particles are in the amount of between about 3% and 70% by weight based on the total weight of said particles and said exfoliated graphite; (b) compressing the mixture in at least a first direction to a pressure (preferably within the range of from about 0.04 MPa to about 350 MPa) into a first cohered mixture; and (c) compressing the first cohered mixture in a second direction, different from the first direction, to a pressure sufficient to produce a flexible graphite foil having a bulk density within the range of from about 0.1 g/cm$^2$ to about 2.0 g/cm$^2$. In this method, step (b) of compressing the mixture in at least a first direction comprises an operation selected from:

(A) compressions in two mutually perpendicular directions; (B) compressions in three mutually perpendicular directions; (C) compression in a cylindrically radial direction; or (D) isostatic compression.

Another preferred method of continuously producing flexible graphite foil, which is less anisotropic, comprises: (a) continuously providing exfoliated graphite flakes (with or without a non-expandable component); (b) continuously compressing the exfoliated graphite flakes (along with other component, if present) in at least a first direction to a pressure (preferably within the range of from about 0.04 MPa to about 350 MPa) into a first cohered graphite compact; and (c) continuously compressing the first cohered graphite compact in a second direction, different from the first direction, to a pressure sufficient to produce a flexible graphite foil having a bulk density within the range of from about 0.1 g/cm$^2$ to about 2.0 g/cm$^2$. Again, step (b) of compressing the flakes or mixture in at least a first direction comprises an operation selected from: (A) compressions in two mutually perpendicular directions; (B) compressions in three mutually perpendicular directions; (C) compression in a cylindrically radial direction; or (D) isostatic compression.

As demonstrated in the examples given below, the recompressed exfoliated graphite article or flexible graphite sheet of the present invention is much more isotropic in terms of electrical conductivity. The article has a first conductivity in a first direction (e.g., thickness-direction or Z-direction), a second conductivity (e.g., X-direction) in a direction perpendicular to the first direction, and a third conductivity in a third direction (e.g., Y-direction, perpendicular to both X- and Z-directions). The anisotropy ratio is defined to be the ratio between the highest conductivity and the lowest conductivity. In the presently invented article, the anisotropy ratio is typically no greater than 30, and further typically no greater than 10. In many cases, this ratio is less than 5 or even less than 2.

EXAMPLE 1

Mixtures of Expanded Graphite and Non-expandable Natural Graphite

A series of mixture compacts, Sample 1-A to 1-H, were prepared as follows: Approximately 0%, 10%, 20%, 30%, 40%, 50%, 60%, and 70% by weight of non-expandable natural graphite particles and corresponding 100% to 30% by weight of acid-intercalated, expandable graphite (based on the total weight of expandable and non-expandable graphite) were mixed to form expandable mixtures. The non-expandable graphite was intended as an isotropy-promoting agent, which can also enhanced the electrical conductivity. The various two-component mixtures were separately enclosed in a quartz tube, which was purged with nitrogen gas and then loosely sealed from both ends of the tube with ceramic cloth. The tube was rapidly transferred to the center of a tube furnace pre-heated to a temperature of 1,050° C. and maintained at that position for 20 seconds. Rapid expansion or exfoliation of the expandable graphite occurred. It may be noted that the exfoliated graphite herein used could comprise some graphite oxide since strong acid intercalation tends to partially oxidize natural graphite.

A desired amount of each of the graphite blends was poured into a molding tool and uniaxially compressed in the Z-direction to a pressure of about 5,000 psi (34.5 MPa) to produce a thin, flat plate (approximately 1 mm thick). The electrical conductivity in the thickness direction and the conductivity in a direction parallel to the plate surface (in-plane conductivity) of all the sample were measured. The values of the anisotropy ratio, defined as the highest conductivity value divided by the lowest conductivity value of a sample measured in different directions. The results are summarized in Table 1:

TABLE 1

Conductivity data of recompressed exfoliated graphite sheets after pressure-rolling (no pre-compression treatment).

| Sample | % Natural flake graphite | Z-dir. Cond. S/cm | X-Y plane cond., S/cm | Anisotropy ratio | Apparent density, g/cm$^3$ |
|---|---|---|---|---|---|
| 1-A | 0 | 11.5 | 2450 | 213.0 | 0.81 |
| 1-B | 10 | 38 | 1350 | 35.5 | 0.92 |
| 1-C | 20 | 78 | 1120 | 14.36 | 1.05 |
| 1-D | 30 | 135 | 1085 | 8.04 | 1.17 |
| 1-E | 40 | 201 | 1004 | 4.99 | 1.31 |
| 1-F | 50 | 205 | 1003 | 4.89 | 1.44 |
| 1-G | 60 | 210 | 989 | 4.71 | 1.56 |
| 1-H | 70 | 206 | 995 | 4.83 | 1.78 |

Table 1 indicates that all samples containing a non-expandable graphite component are less anisotropic than the sample without any isotropy promoter. The higher the proportion of the non-expandable component, the more isotropic is the resulting uniaxially compressed flexible graphite sheet. The thickness-direction conductivity increases with the increasing amount of non-expandable graphite. The conductivity values of all samples containing some non-expandable graphite are very good.

EXAMPLE 2

Mixtures of Expandable Graphite and Non-expandable Spheroidal Graphite (Uniaxial Compression in the X-direction, Followed by a Rolling Compression in the Z-direction According to Approach 1)

A series of mixture compacts, Sample 2-A to 2-D, were prepared as follows: Approximately 0%, 5%, 15%, and 35% by weight of non-expandable, spheroidal graphite particles (supplied from Hua Dong Graphite Co., Pingdu, China) and the balanced amounts (100% to 65% by weight) of acid-intercalated, expandable graphite were mixed to form expandable mixtures. The various two-component mixture were separately enclosed in a quartz tube, which was purged with nitrogen gas and then loosely sealed from both ends of the tube with ceramic cloth. The tube was rapidly transferred to the center of a tube furnace pre-heated to a temperature of 1,050° C. and maintained at that position for 20 seconds. Rapid expansion or exfoliation of the expandable graphite occurred.

A desired amount of each of the various graphite blends was poured into a mold and uniaxially compressed in the X-direction to a pressure of about 1,000 psi (6.9 MPa) to produce a mixture compact, which was then compressed in the Z-direction with a pressure of about 2,000 psi to produce a thin, flat plate (approximately 1 mm thick). The electrical conductivity values in the three directions of all samples and the corresponding anisotropy ratios are given in Table 2.

TABLE 2

Conductivity data of recompressed exfoliated graphite sheets after X-directional compression, followed by Z-directional compression via pressure rolls.

| Sample | % Spheroidal graphite | Z-dir. Cond. S/cm | X-dir. Cond. S/cm | Y-dir. Cond. S/cm | Anisotropy ratio |
|---|---|---|---|---|---|
| 2-A | 0 | 140 | 450 | 1360 | 9.71 |
| 2-B | 5 | 152 | 455 | 1240 | 8.16 |
| 2-C | 15 | 210 | 460 | 1080 | 5.14 |
| 2-D | 35 | 310 | 473 | 1025 | 3.31 |

Table 2 indicates that all samples containing a non-expandable graphite component are less anisotropic than the sample without any isotropy promoter. The higher the proportion of the non-expandable component, the more isotropic is the resulting uniaxially compressed flexible graphite sheet. The thickness-direction conductivity increases with the increasing amount of non-expandable graphite. The conductivity values of all samples containing some non-expandable graphite are very impressive (140-310 S/cm), which are much greater than those of prior art flexible graphite composites (33 S/cm at best, typically less than 15 S/cm).

SAMPLE 3

Mixtures of Expandable Graphite and Non-expandable Spheroidal Graphite (Uniaxial Compression in the X- and Y-directions, Followed by a Rolling Compression in the Z-direction)

A series of mixture compacts, Sample 3-A to 3-C, were prepared as follows:

Approximately 0%, 15%, and 30% by weight of non-expandable, spheroidal graphite particles and the balanced amounts (100%, 85%, and 65% by weight, respectively) of acid-intercalated, expandable graphite were mixed to form expandable mixtures. The various two-component mixtures were separately enclosed in a quartz tube, which was purged with nitrogen gas and then loosely sealed from both ends of the tube with ceramic cloth. The tube was rapidly transferred to the center of a tube furnace pre-heated to a temperature of 1,050° C. and maintained at that position for 20 seconds. Rapid expansion or exfoliation of the expandable graphite occurred.

A desired amount of each of the graphite blends was poured into a mold and uniaxially compressed in the X- and Y-directions to a pressure of about 1,000 psi (6.9 MPa) to produce a mixture compact, which was then compressed in the Z-direction with a pressure of about 2,000 psi to produce a thin, flat plate (approximately 1 mm thick). The electrical conductivity values in the three directions of all samples and the corresponding anisotropy ratios are given in Table 3:

TABLE 3

Conductivity data of recompressed exfoliated graphite sheets after X-dir compression, Y-dir compression, followed by Z-dir compression.

| Sample | % Spheroidal graphite | Z-dir. Cond. S/cm | X-dir. Cond. S/cm | Y-dir. Cond. S/cm | Anisotropy ratio |
|---|---|---|---|---|---|
| 3-A | 0 | 313 | 625 | 368 | 2.00 |
| 3-B | 15 | 343 | 610 | 360 | 1.78 |
| 3-C | 30 | 368 | 623 | 372 | 1.69 |

Table 3 further confirms that all samples containing a non-expandable graphite component are less anisotropic than the sample without any isotropy promoter. The higher the proportion of the non-expandable component, the more isotropic is the resulting uniaxially compressed flexible graphite sheet. The thickness-direction conductivity increases with the increasing amount of non-expandable graphite. The conductivity values of all samples containing some non-expandable graphite are outstanding (343 and 369 S/cm).

EXAMPLE 4

Mixtures of Expanded Graphite and Non-expandable Spheroidal Graphite (Isostatically Compressed, Followed by Z-directional Compression, According to Approach 2)

A series of mixture compacts (Sample 4-A to 4-C) were prepared as follows: An expandable graphite sample was prepared by immersing a blend of 50% short graphite fibers and 50% spheroidal graphite in a solution composed of sulfuric acid, nitric acid, and potassium permanganate (at a ratio of 4:1:0.05) at room temperature for 20 hours. The solid mixture was washed and rinsed until the pH value of the rinsing water reaches at least 6.0. The solid mixture was than dried in a ventilated chemical hood. The resulting product was the desired expandable graphite component. The mixture was enclosed in a quartz tube, which was purged with nitrogen gas and then loosely sealed from both ends of the tube with ceramic cloth. The tube was rapidly transferred to the center of a tube furnace pre-heated to a temperature of 1,050° C. and maintained at that position for 20 seconds. Rapid expansion or exfoliation of the expandable graphite occurred, forming graphite worms, which were interconnected networks of exfoliated graphite flakes. Approximately 0%, 15%, and 30% by weight of non-expandable graphite/carbon particles (meso-phase micro-beads, MCMB) and the balanced amounts (100%, 85%, and 65% by weight, respectively) of the worms were mixed to form three separate compressible mixtures. The MCMB beads were supplied from Aluminum Trading Co., an US distributor for Osaka Gas Co., (Osaka, Japan) that manufactured MCMBs.

A desired amount of each of the compressible mixtures was poured into a rubber mold and isostatically compressed to a pressure of about 1,000 psi (6.9 MPa) to produce a mixture compact, which was then compressed in the Z-direction with a pressure of about 2,000 psi to produce a thin, flat plate (approximately 1 mm thick). The electrical conductivity values of all samples and the corresponding anisotropy ratios are given in Table 4.

TABLE 4

Conductivity data of recompressed exfoliated graphite sheets after an isostatic compression in all directions, followed by a Z-direction rolling.

| Sample | % MCMB beads | Z-dir. Cond. S/cm | X-dir. Cond. S/cm | Y-dir. Cond. S/cm | Anisotropy ratio |
|---|---|---|---|---|---|
| 4-A | 0 | 147 | 586 | 542 | 3.99 |
| 4-B | 15 | 319 | 465 | 430 | 1.46 |
| 4-C | 30 | 332 | 445 | 440 | 1.34 |

The data again demonstrates that non-expandable graphite particles are an effective isotropy-promoting agent, resulting in exceptional thickness-direction conductivity. Isostatic pre-compressions prior to the final shaping operation (Z-direction), provides an effective way of producing relatively isotropic flexible graphite sheets and exfoliated graphite-based bipolar plates with excellent electrical conductivity properties.

EXAMPLE 5

Mixtures of Expanded Graphite and Non-expandable Spheroidal Graphite (Isostatically Compressed)

Samples 5-A, 5-B, and 5-C were identical to 4-A, 4-B, and 4-C, respectively, but without the final Z-directional rolling. Their properties are shown in Table 5, which again demonstrates the good isotropy and high thickness-directional conductivity associated with exfoliated graphite mixtures containing non-expandable, conductive, solid and rigid particles.

TABLE 5

Conductivity data of recompressed exfoliated graphite sheets after an isostatic compression in all directions.

| Sample | % MCMB beads | Z-dir. Cond. S/cm | X-dir. Cond. S/cm | Y-dir. Cond. S/cm | Anisotropy ratio |
|---|---|---|---|---|---|
| 5-A | 0 | 324 | 424 | 434 | 1.31 |
| 5-B | 15 | 412 | 414 | 390 | 1.01 |
| 5-C | 30 | 401 | 410 | 420 | 1.02 |

EXAMPLE 6

Mixtures of Expanded Graphite and Non-expandable Spheroidal Graphite and Non-expandable Graphite Fibers (Isostatically Compressed)

Samples 6-A, 6-B, and 6-C were identical to 4-A, 4-B, and 4-C, respectively, but each with an additional 5% by weight of short graphite fibers (2-5 mm in length). Their properties are shown in Table 6, which again demonstrates the good isotropy and high thickness-directional conductivity associated with exfoliated graphite mixtures containing non-expandable, conductive, solid and rigid particles.

TABLE 6

Conductivity data of recompressed exfoliated graphite sheets after an isostatic compression in all directions, followed by a Z-direction rolling.

| Sample | % MCMB beads | Z-dir. Cond. S/cm | X-dir. Cond. S/cm | Y-dir. Cond. S/cm | Anisotropy ratio |
|---|---|---|---|---|---|
| 6-A | 0 | 167 | 510 | 510 | 3.05 |
| 6-B | 15 | 332 | 445 | 433 | 1.34 |
| 6-C | 30 | 345 | 425 | 420 | 1.23 |

In summary, the present invention provides the fuel cell industry with a highly conductive, relatively isotropic flexible graphite sheets and related flow field plate or bipolar plate products. The resulting fuel cell system is of lower costs (due to their amenability to mass production) and better performance (due to lower contact resistance and internal resistance and, hence, higher voltage and power output). The presently invented exfoliated graphite composition has the following additional features and advantages:

(1) This composition can be manufactured by using a fast and cost-effective process. The process can be automated and adapted for mass production. The starting materials are relatively inexpensive graphite-based materials. No expensive and tedious process such as chemical vapor infiltration is required. The resulting flexible graphite sheet and bipolar plate or flow field plate are of low cost.

(2) The bipolar plate obtained from the presently invented composition exhibits excellent electrical conductivity that exceeds the target bipolar plate conductivity value as set forth by the US Department of Energy for automotive fuel cell applications. As a matter of fact, no prior art flexible graphite-based bipolar plates exhibit a thickness-direction electrical conductivity as high as what is obtained with the instant invention.

(3) The composition may be made into a precursor form for easy storing, shipping, and handling operations. For instance, rolls of exfoliated graphite sheets may be stored with a long shelf life. Flexible graphite sheets may then be combined with a core resin-filler nanocomposite layer to form a sheet molding compound, which is molded into a bipolar plate when and where the plates are needed.

(4) The above six examples have clearly demonstrated the effectiveness of non-expandable, rigid, conductive particles in promoting the isotropy and enhancing thickness-direction conductivity of exfoliated graphite-based materials.

The invention claimed is:

1. A recompressed exfoliated graphite article free of impregnating resin comprising a mixture of:

(a) expanded or exfoliated graphite flakes; and (b) non-expandable particles as an isotropy promoter, wherein said non-expandable particles are selected from natural graphite, synthetical graphite, highly oriented pyrolytic graphite, graphite oxide, graphite fluoride, chemically modified graphite, spheroidal graphite, meso-porous micro-beads, or a combination thereof and are in an amount of between about 3% and about 70% by weight based on the total weight of said particles and said exfoliated graphite flakes;

wherein said mixture is compressed to form said article having an apparent bulk density of from about 0.1 g/cm$^3$ to about 2.0 g/cm$^3$, an anisotropy ratio from 1.01 to 35.5, and a thickness-direction conductivity not less than 50 S/cm.

2. The article as defined in claim 1 wherein at least a portion of said article is in a plate, sheet, or film form having a thickness-direction electrical conductivity no less than 300 S/cm.

3. The article as defined in claim 1, further comprising a reinforcement or filler selected from the group consisting of graphite or carbon fiber, graphite or carbon nano-fiber, nano-tube, glass fiber, ceramic fiber, polymer fiber, metal fiber, metal particle, polymer particle, organic particle, inorganic particle, or a combination thereof, wherein said reinforcement or filler is between 0.5% and 30% by weight based on the total weight of said expanded graphite, particles of non-expanded graphite or carbon, and reinforcement or filler.

4. The article as defined in claim 1 wherein said expanded graphite flakes are obtained from intercalation and exfoliation of a graphite material selected from natural graphite, synthetical graphite, highly oriented pyrolytic graphite, graphite fiber, graphitic nano-fiber, spheroidal graphite, meso-carbon micro-bead, graphite oxide, graphite fluoride, chemically modified graphite, or a combination thereof.

5. The article as defined in claim 1, wherein said article is used as a component of a fuel cell separator or flow field plate.

6. The article as defined in claim 1, wherein said article is used as a component of a current collector for a fuel cell, battery, supercapacitor, or electrochemical cell.

7. The article as defined in claim 1, wherein said article is in a thin flexible sheet or film form with a thickness smaller than 2 mm.

8. The article as defined in claim 1, wherein said article is in a thin flexible sheet or film form with a thickness smaller than 0.5 mm.

9. The article as defined in claim 1, wherein said article is in a thin flexible sheet or film form with a thickness smaller than 0.3 mm.

10. The article as defined in claim 1, wherein said article has a first conductivity in a first direction and a second conductivity in a direction perpendicular to said first direction, wherein said first conductivity is lower than said second conductivity and the ratio of said second conductivity to said first conductivity is no greater than 30.

11. The article as defined in claim 1, wherein said article has a first conductivity in a first direction and a second conductivity in a direction perpendicular to said first direction, wherein said first conductivity is lower than said second conductivity and the ratio of said second conductivity to said first conductivity is no greater than 10.

12. The as defined in claim 1, wherein said article has a first conductivity in a first direction and a second conductivity in a direction perpendicular to said first direction, wherein said first conductivity is lower than said second conductivity and the ratio of said second conductivity to said first conductivity is no greater than 5.

13. The article as defined in claim 1, wherein said article has a first conductivity in a first direction and a second conductivity in a direction perpendicular to said first direction, wherein said first conductivity is lower than said second conductivity and the ratio of said second conductivity to said first conductivity is no greater than 2.

14. The article as defined in claim 1 wherein at least a portion of said article is in a plate, sheet, or film form having a thickness-direction and a surface plane perpendicular to said thickness direction, and wherein said article has an electrical conductivity in a direction parallel to said surface plane no less than 1,000 S/cm and a thickness-direction conductivity not less than 150 S/cm.

15. The article as defined in claim 14 wherein said article has electrical conductivity values greater than 100 S/cm in three mutually perpendicular directions.

16. The article as defined in claim 15 wherein said article has electrical conductivity values greater than 200 S/cm in three mutually perpendicular directions.

17. The article as defined in claim 16 wherein said article has electrical conductivity values greater than 300 S/cm in three mutually perpendicular directions.

18. A recompressed exfoliated graphite article free of impregnating resin comprising a mixture of:

(a) expanded or exfoliated graphite flakes; and (b) non-expandable particles as an isotropy promoter, wherein said non-expandable particles are selected from natural graphite, synthetical graphite, highly oriented pyrolytic graphite, graphite oxide, graphite fluoride, chemically modified graphite, spheroidal graphite, meso-porous micro-beads, or a combination thereof and are in an amount of between about 3% and about 70% by weight based on the total weight of said particles and said exfoliated graphite flakes;

wherein said mixture is compressed to form said article having an apparent bulk density of from about 0.1 g/cm$^3$ to about 2.0 g/cm$^3$, an anisotropy ratio from 1.23 to 8.16 and a thickness-direction conductivity not less than 200 S/cm.

19. The article as defined in claim 18 wherein at least a portion of said article is in a plate, sheet, or film form having a thickness-direction electrical conductivity no less than 300 S/cm.

20. The article as defined in claim 18, wherein said article has a first conductivity in a first direction and a second conductivity in a direction perpendicular to said first direction, wherein said first conductivity is lower than said second conductivity and the ratio of said second conductivity to said first conductivity is no greater than 5.

21. The article as defined in claim 18, wherein said article has a first conductivity in a first direction and a second conductivity in a direction perpendicular to said first direction, wherein said first conductivity is lower than said second conductivity and the ratio of said second conductivity to said first conductivity is no greater than 2.

22. The article as defined in claim 18 wherein at least a portion of said article is in a plate, sheet, or film form having a thickness-direction and a surface plane perpendicular to said thickness direction, and wherein said article has an electrical conductivity in a direction parallel to said surface plane no less than 1,000 S/cm and a thickness-direction conductivity greater than 200 S/cm.

23. The article as defined in claim 22 wherein said article has electrical conductivity values greater than 200 S/cm in three mutually perpendicular directions.

24. The article as defined in claim 23 wherein said article has electrical conductivity values greater than 300 S/cm in three mutually perpendicular directions.

* * * * *